Feb. 22, 1949.　　P. H. JOHNSON ET AL　　2,462,643
ENDLESS TRACK FOR VEHICLES

Filed March 4, 1946　　　　　　　　　　3 Sheets-Sheet 1

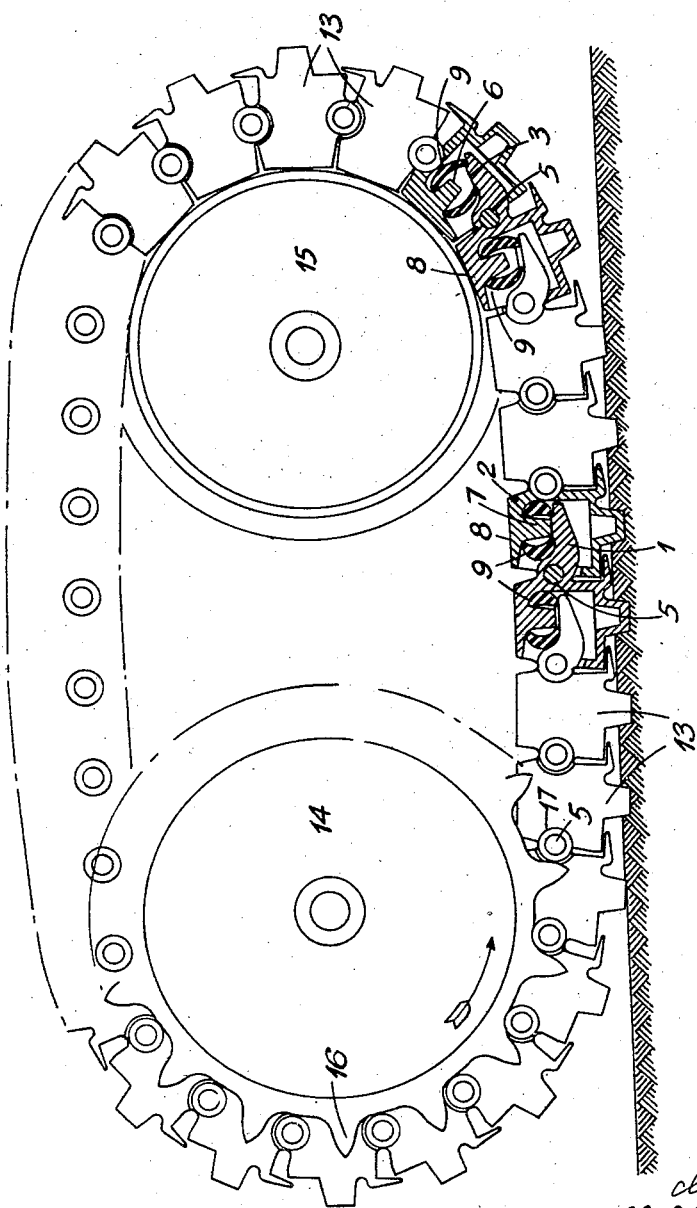

Feb. 22, 1949.   P. H. JOHNSON ET AL   2,462,643
ENDLESS TRACK FOR VEHICLES
Filed March 4, 1946   3 Sheets-Sheet 3

Inventors:
Philip H. Johnson, and
Leonard W. Tripp,
By their attorneys
Baldwin & Wight Patented Feb. 22, 1949

2,462,643

UNITED STATES PATENT OFFICE 2,462,643

ENDLESS TRACK FOR VEHICLES

Philip Henry Johnson and Leonard William Tripp, Hounslow, England, assignors to Roadless Traction Limited, Hounslow, Middlesex, England Application March 4, 1946, Serial No. 651,792
In Great Britain December 21, 1944

4 Claims. (Cl. 305—10)

This invention relates to endless tracks of the "locked girder" type, i. e., tracks in which the links are provided with abutment surfaces which coact by mutual engagement as the track is laid of the ground so as to prevent reverse curvature.

In operation under certain conditions there is always the liability of dirt and like extraneous matter becoming lodged between coacting abutment surfaces whereby the links concerned may be locked at a smaller curvature than that for which the abutment surfaces were designed to produce.

The object of the invention is to obviate the possibility of this happening.

According to the invention, the coacting abutment surfaces of adjacent links are rendered inaccessible to dirt by an encasement adapted to accommodate the relative movement of the abutment surfaces towards and away from one another.

In the preferred form the encasement is constructed and arranged so as to be capable of expanding and contracting. Accordingly the encasement may be made of resiliently deformable material, e. g. rubber, which is compressed between parts of the respective links when the abutment surfaces are in engagement, so that it will expand, whilst maintaining its contact with such parts, when the abutment surfaces separate. At least one of the coacting abutment surfaces may be formed on a member projecting from a surface of the link, the projecting member being surrounded by the encasement, of tubular form, whose end bears on the said surface of the link. This surface may be the underside of the roller-path portion of the link. The coacting abutment surface on the other link may be then formed on or carried by a flat extension of the lug or lugs through which the hinge pin passes.

The abutment surfaces may be relatively disposed so that they move towards and away from one another at right angles to the run of the track or in any other desired direction.

The encasement may be constructed in various other forms and of various materials. For instance, it may be made of flexible material with sufficient bagginess to accommodate the relative movements of the abutment surfaces, or it may be in the form of a bellows or concertina like construction.

It will also be appreciated that the resilient encasement may be of dimensions and material as will offer such resistance to deformation as will result in giving to the endless track an elastic girder or spring effect.

By the provision of protective means according to the invention the area of the abutment surfaces may be made more extensive than is customary with the advantage of a better distribution of the load stresses.

The invention is illustrated by way of example in the accompanying drawings in which:

Figure 4 is a diagrammatic side elevation, partly in section, of an endless track entrained around a driving sprocket and idler and formed of links having abutting elements as shown in Figures 1 and 3;

Figure 1:
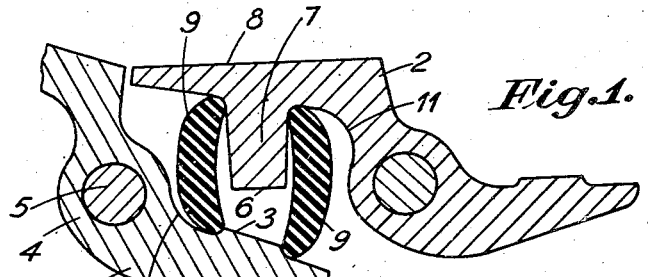
Figure 1 is a section, in a plane at right angles to the hinge, of the abutting elements of adjacent hinged links, out of engagement, embodying one form of the invention.
Figure 2:
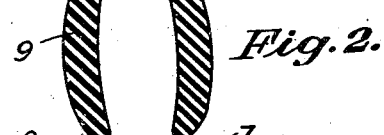
Figure 2 is a detail of Figure 1 in section.
Figure 3:
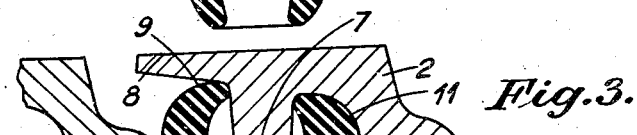
Figure 3 is a section corresponding to Figure 1 showing the abutting elements in engagement.

Referring to Figures 1, 2 and 3, the abutting elements of two adjacent hinged links are marked 1 and 2. The abutment surface 3 of the element 1 is formed on an extension of the lug 4 through which the hinge pin 5 passes. The abutment surface 6 of the element 2 is formed on a member 7 projecting from the underside of the roller-path portion 8 of the link. The links are of the single abutment construction with which the reaction load is taken on the pin 5. The projecting member 7 is surrounded by a tubular encasement 9 of rubber whose upper end bears on the surface of the element 2, surrounding the base of the projecting member 7. The lower end of the tubular encasement 9 bears on the surface of the element 1, surrounding the abutment surface 3.

Figure 2 shows the tubular encasement 9 by itself in the uncompressed state and it will be noted, by comparison, that the tubular encasement is compressed to some extent in the position shown in Figure 1, ensuring that contact is maintained with the respective abutting elements at both ends of the tubular encasement.

Figure 3 shows the greater extent of compression of the tubular encasement 9 when the abutment surfaces 3 and 6 are in engagement. It may be noted that the surfaces of the elements 1 and 2 at 10 and 11 are suitably rounded so as to accommodate snugly and support the walls, adjacent thereto, of the compressed tubular encasement.

In Figure 4 an endless track composed of hinged links 13 is shown entrained around a forward driving sprocket 14 and a rearward idler 15. The driving sprocket has teeth 16 engaging rollers 17 mounted on the link hinge pins 5. The abutment elements 1 and 2 of the links 13 and the elements associated therewith, are constructed as shown in Figures 1 and 3 and are identified by the same reference numerals.

Figure 5:
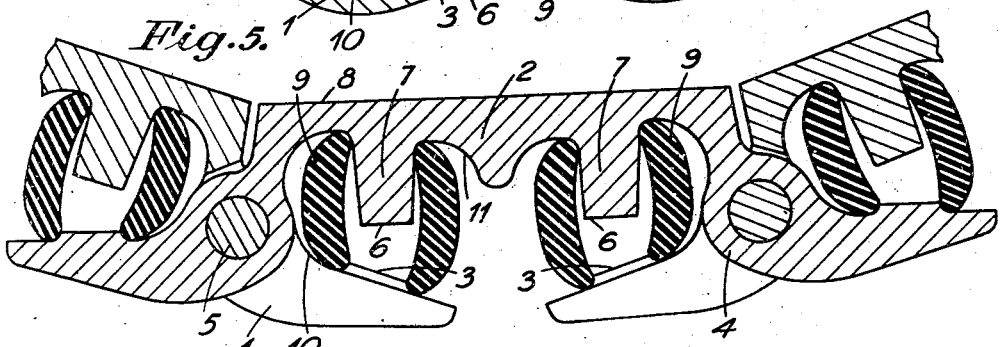
Figure 5 is a section similar to Figure 1 but showing a modification of construction.
Figure 6:
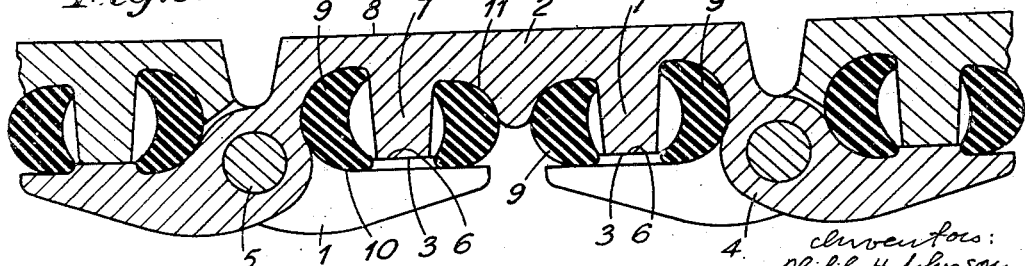
Figure 6 is a section corresponding to Figure 5 but showing the abutting elements in engagement instead of out of engagement.

In Figures 5 and 6, the invention is shown as applied to links of the double abutment construction with which there is no load on the hinge pins 5. Except for the additional abutment surfaces, and the consequent modification of the form of the links and their abutting elements, as shown, the features of construction are the same as those already described with reference to Figures 1, 2 and 3 and are accordingly marked with the same reference numerals, no further description being needed.

Figure 7:
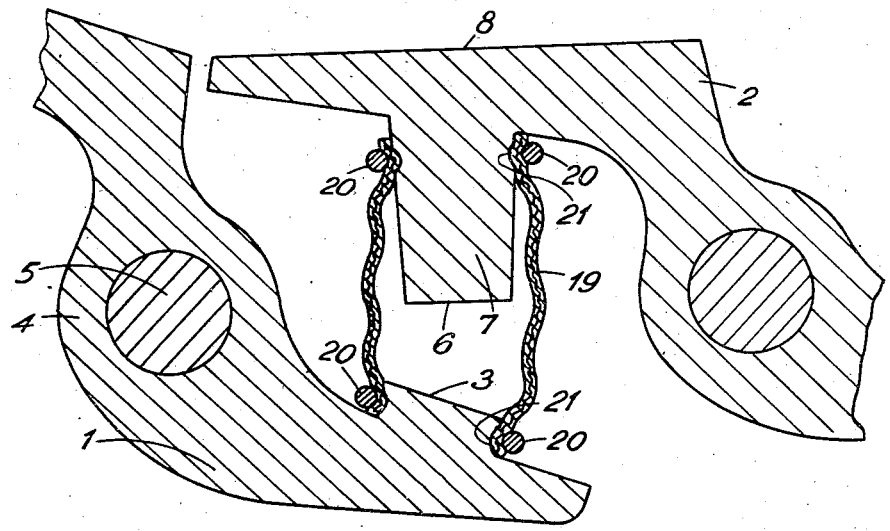
Figure 7 is a section similar to Figure 1 but showing a further modification of construction.

Figure 7 differs from Figure 1 in that a baggy encasement 19 of flexible but substantially non-resilient material, e. g. fabric, is used instead of a rubber encasement. In this case the ends of the encasement are secured by means of spring rings 20 embracing the material and pressing it into grooves 21 in the surfaces around the abutments.

What we claim is:

1. An endless track comprising a plurality of pairs of links, abutment surfaces formed on the links so that the abutment surfaces of the links of a pair coact by mutual engagement as the track is laid on the ground to prevent reverse curvature, a member projecting from a surface of at least one link of a pair and upon which the abutment surface of said link is formed, a tubular encasement of resiliently deformable material surrounding the said member and bearing at one end on the surface from which said member projects and having a seating at the other end around the abutment surface of the other link of the pair.

2. An endless track comprising a plurality of pairs of links, abutment surfaces formed on the links and so disposed that the abutment surfaces of the links of a pair move towards and away from one another substantially at right angles to the run of the track and coact by mutual engagement as the track is laid on the ground to prevent reverse curvature, each link having a roller-path portion, at least one member projecting from the underside of said portion and formed with a downwardly facing abutment surface, and at least one lug extension formed with an upwardly facing abutment surface, a tubular encasement surrounding said projecting member of a link and surrounding the upwardly facing abutment surface of an adjacent link.

3. An endless track comprising a plurality of pairs of links, abutment surfaces formed on the links and so disposed that the abutment surfaces of the links of a pair move towards and away from one another substantially at right angles to the run of the track and coact by mutual engagement as the track is laid on the ground to prevent reverse curvature, each link having a roller-path portion, at least one member projecting from the underside of said portion and formed with a downwardly facing abutment surface, and at least one lug extension formed with an upwardly facing abutment surface, a tubular encasement of resiliently deformable material under compression, surrounding said projecting member of a link and surrounding the upwardly facing abutment surface of an adjacent link.

4. An endless track comprising a plurality of pairs of links, projecting opposed abutments formed on said links so that the abutments of the links of a pair coact by mutual engagement as the track is laid on the ground to prevent reverse curvature, and a tubular encasement of resiliently deformable material interposed between the links of each pair and surrounding respective opposed abutments.

PHILIP HENRY JOHNSON.
LEONARD WILLIAM TRIPP.

REFERENCES CITED

The following references are of record in the file of this patent:

UNITED STATES PATENTS

| Number | Name | Date |
|---|---|---|
| 1,308,308 | Sullivan | July 1, 1919 |
| 1,451,516 | Penn | Apr. 10, 1923 |

FOREIGN PATENTS

| Number | Country | Date |
|---|---|---|
| 97,443 | Austria | 1924 |